US012619340B2

(12) United States Patent
Fukushima et al.

(10) Patent No.: US 12,619,340 B2
(45) Date of Patent: May 5, 2026

(54) INFORMATION DISPLAY DEVICE AND COMPUTER PROGRAM TO PRIORITIZE AND TRANSMIT INFORMATION FOR VERIFICATION TO A USER

(71) Applicant: FUJIFILM CORPORATION, Tokyo (JP)

(72) Inventors: Tatsuo Fukushima, Kanagawa (JP); Yuji Onozawa, Kanagawa (JP); Takafumi Haruta, Kanagawa (JP); Yohei Makino, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 281 days.

(21) Appl. No.: 18/570,028

(22) PCT Filed: Jul. 21, 2022

(86) PCT No.: PCT/JP2022/028376
§ 371 (c)(1),
(2) Date: Dec. 13, 2023

(87) PCT Pub. No.: WO2023/008314
PCT Pub. Date: Feb. 2, 2023

(65) Prior Publication Data
US 2024/0281120 A1      Aug. 22, 2024

(30) Foreign Application Priority Data
Jul. 29, 2021      (JP) ................................. 2021-124730

(51) Int. Cl.
G06F 3/0484      (2022.01)
G06F 3/0482      (2013.01)
(Continued)

(52) U.S. Cl.
CPC .......... *G06F 3/0484* (2013.01); *G06F 3/0482* (2013.01); *G06F 3/0485* (2013.01); *H04N 1/00482* (2013.01); *H04N 1/00506* (2013.01)

(58) Field of Classification Search
CPC ........... H04N 1/00413; H04N 1/00437; H04N 1/00514; H04N 1/00506; H04N 1/00482; G06F 3/0484; G06F 3/0482; G06F 3/0485
See application file for complete search history.

(56) References Cited

U.S. PATENT DOCUMENTS 8,451,483 B2 *   5/2013   Yamada ................ G06F 3/1203
                                                         358/1.15
8,681,356 B2 *   3/2014   Shimizu ............. H04N 1/00416
                                                         358/1.15
(Continued)

FOREIGN PATENT DOCUMENTS

JP        2006-023635 A      1/2006
JP        2009-237820 A      10/2009
JP        2019-003491 A      1/2019

*Primary Examiner* — Patrick F Riegler
(74) *Attorney, Agent, or Firm* — SOLARIS Intellectual Property Group, PLLC

(57) ABSTRACT

An information display device 10 provided with a CPU 11. The CPU 11 executes processing including determining priority information to prioritize for display from among content not being displayed at an operation screen that is displayed at a user interface and that includes a region to receive execution of processing from a user, and displaying the determined priority information at the region on the operation screen.

11 Claims, 9 Drawing Sheets

(A)

(C)

(B)

(D)

(51) Int. Cl.
    *G06F 3/0485*         (2022.01)
    *H04N 1/00*         (2006.01)

(56)            References Cited

U.S. PATENT DOCUMENTS

| | | | | |
|---|---|---|---|---|
| 9,781,281 | B2* | 10/2017 | Ebitani | H04N 1/00503 |
| 10,620,973 | B1* | 4/2020 | Gailloux | G06F 9/451 |
| 2008/0244455 | A1* | 10/2008 | Seto | H04N 1/00347 |
| | | | | 715/840 |
| 2010/0290068 | A1* | 11/2010 | Okada | H04N 1/00472 |
| | | | | 358/1.9 |
| 2010/0290071 | A1* | 11/2010 | Okada | G03G 15/5091 |
| | | | | 358/1.13 |
| 2011/0051165 | A1* | 3/2011 | Yamada | H04N 1/00413 |
| | | | | 358/1.15 |
| 2012/0030329 | A1* | 2/2012 | Aoki | H04N 1/00347 |
| | | | | 709/223 |
| 2013/0222435 | A1* | 8/2013 | Choi | H04M 1/2746 |
| | | | | 345/684 |
| 2014/0019914 | A1* | 1/2014 | Amano | H04N 1/00474 |
| | | | | 715/825 |
| 2014/0071483 | A1* | 3/2014 | Urakawa | H04N 1/0035 |
| | | | | 358/1.15 |
| 2014/0331164 | A1* | 11/2014 | Enomoto | H04N 1/00307 |
| | | | | 715/771 |
| 2014/0331170 | A1* | 11/2014 | Hyun | G06F 3/04842 |
| | | | | 715/835 |
| 2015/0242712 | A1* | 8/2015 | Awano | G03G 15/502 |
| | | | | 358/1.15 |
| 2015/0244885 | A1* | 8/2015 | Koike | H04N 1/00477 |
| | | | | 358/1.9 |
| 2015/0370514 | A1* | 12/2015 | Yoshihara | G06F 3/1275 |
| | | | | 358/1.13 |
| 2016/0065766 | A1* | 3/2016 | Miyamoto | H04N 1/00517 |
| | | | | 358/1.13 |
| 2016/0352960 | A1* | 12/2016 | Morita | H04N 1/00466 |
| 2017/0102849 | A1* | 4/2017 | Ha | G06F 3/0482 |
| 2017/0163826 | A1* | 6/2017 | Nakazawa | H04N 1/00482 |
| 2018/0063377 | A1* | 3/2018 | Tanabe | H04N 1/00413 |
| 2018/0174077 | A1* | 6/2018 | Watase | G06Q 10/02 |
| 2018/0364953 | A1 | 12/2018 | Watanabe | |
| 2019/0306349 | A1* | 10/2019 | Shino | H04N 1/00482 |
| 2019/0384471 | A1* | 12/2019 | Maekawa | G06F 3/0482 |
| 2020/0059568 | A1* | 2/2020 | Satake | H04N 1/00427 |
| 2020/0220991 | A1* | 7/2020 | Minamide | H04N 1/00493 |
| 2020/0272312 | A1* | 8/2020 | Kanazawa | G06F 3/1253 |
| 2021/0216699 | A1* | 7/2021 | Muthukesavaraj | G06F 3/0485 |
| 2021/0297539 | A1* | 9/2021 | Yoshida | G06F 3/0482 |
| 2022/0014639 | A1* | 1/2022 | Omori | H04N 1/00437 |
| 2022/0239791 | A1* | 7/2022 | Samo | H04N 1/00405 |
| 2022/0294919 | A1* | 9/2022 | Seto | H04N 1/00477 |
| 2022/0321719 | A1* | 10/2022 | Sekine | H04N 1/00427 |
| 2024/0422272 | A1* | 12/2024 | Oka | B41J 29/38 |

* cited by examiner

Figure 7:
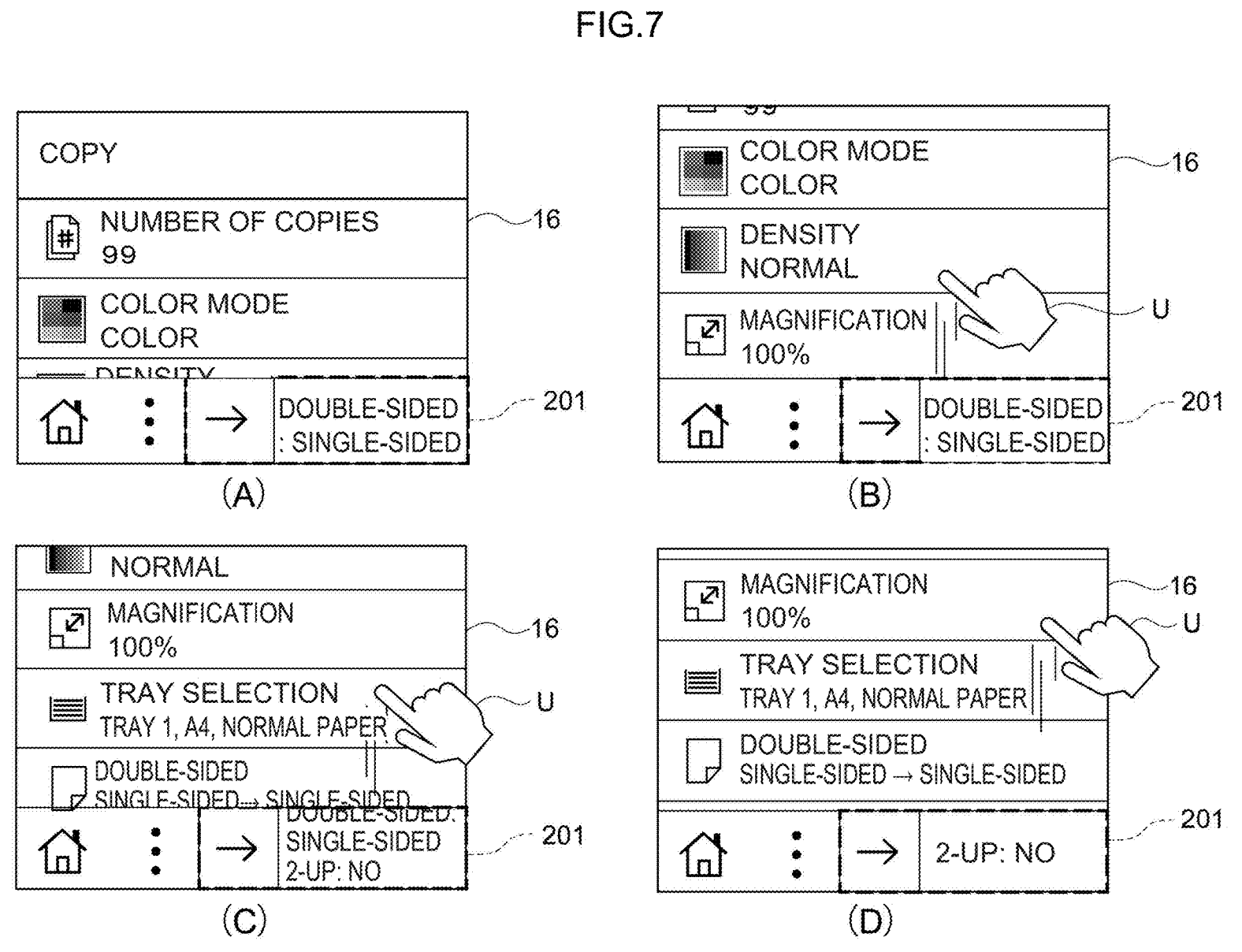

COPY

NUMBER OF COPIES
99

COLOR MODE
COLOR

DENSITY

DOUBLE-SIDED
: SINGLE-SIDED

16

201

(B)

COLOR MODE
COLOR

DENSITY
NORMAL

MAGNIFICATION
100%

DOUBLE-SIDED
: SINGLE-SIDED

16

U

201

(C)

NORMAL

MAGNIFICATION
100%

TRAY SELECTION
TRAY 1, A4, NORMAL PAPER

DOUBLE-SIDED
SINGLE-SIDED → SINGLE-SIDED

SINGLE-SIDED
2-UP: NO

16

U

201

(D)

MAGNIFICATION
100%

TRAY SELECTION
TRAY 1, A4, NORMAL PAPER

DOUBLE-SIDED
SINGLE-SIDED → SINGLE-SIDED

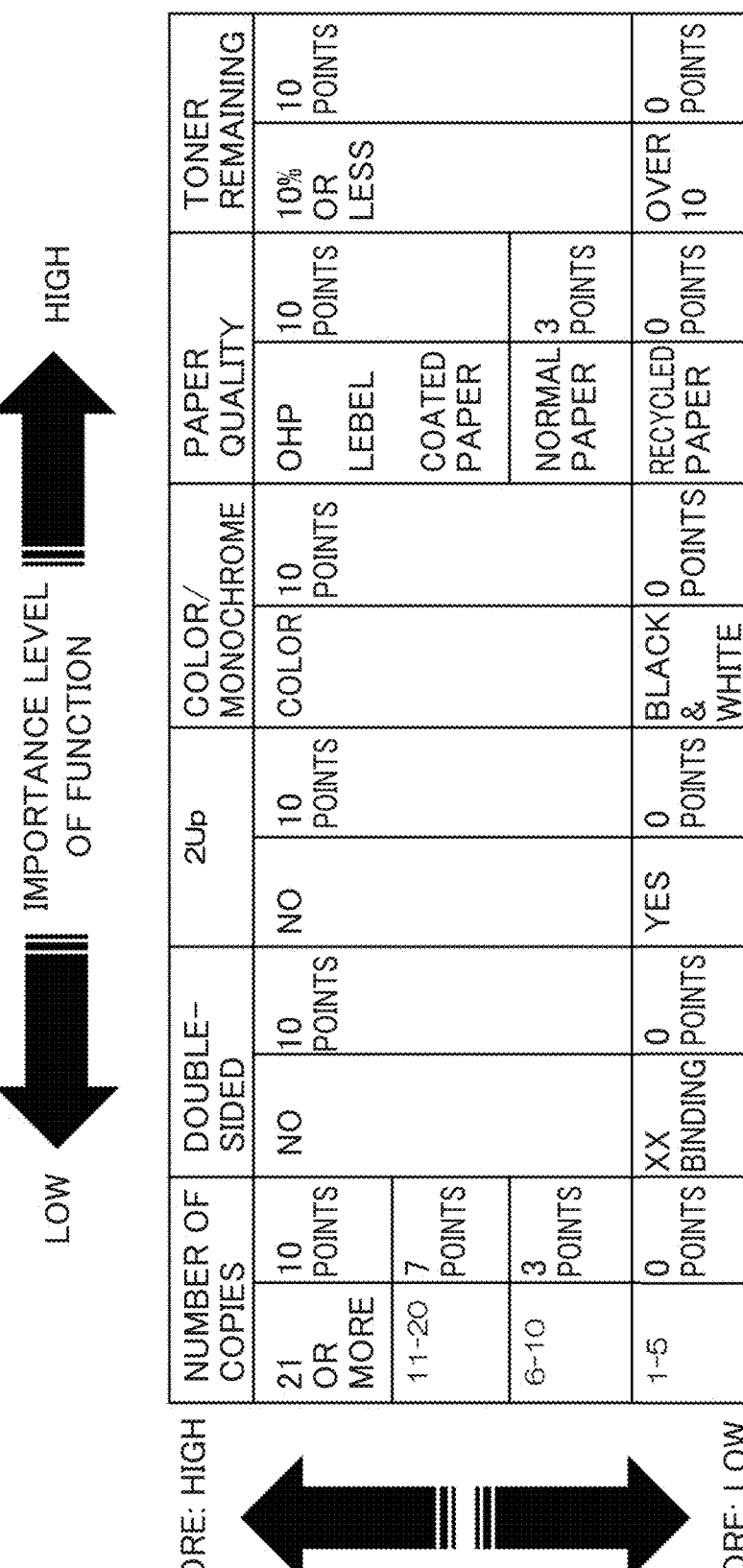

| NUMBER OF COPIES | | DOUBLE-SIDED | | 2Up | | COLOR/MONOCHROME | | PAPER QUALITY | | TONER REMAINING | |
|---|---|---|---|---|---|---|---|---|---|---|---|
| 21 OR MORE | 10 POINTS | NO | 10 POINTS | NO | 10 POINTS | COLOR | 10 POINTS | OHP | 10 POINTS | 10% OR LESS | 10 POINTS |
| 11-20 | 7 POINTS | | | | | | | LEBEL | | | |
| 6-10 | 3 POINTS | | | | | | | COATED PAPER | | | |
| | | | | | | | | NORMAL PAPER | 3 POINTS | | |
| 1-5 | 0 POINTS | XX BINDING | 0 POINTS | YES | 0 POINTS | BLACK & WHITE | 0 POINTS | RECYCLED PAPER | 0 POINTS | OVER 10 | 0 POINTS |

IMPORTANCE LEVEL OF FUNCTION

LOW ← → HIGH

SCORE: HIGH ← → SCORE: LOW

FIG.9
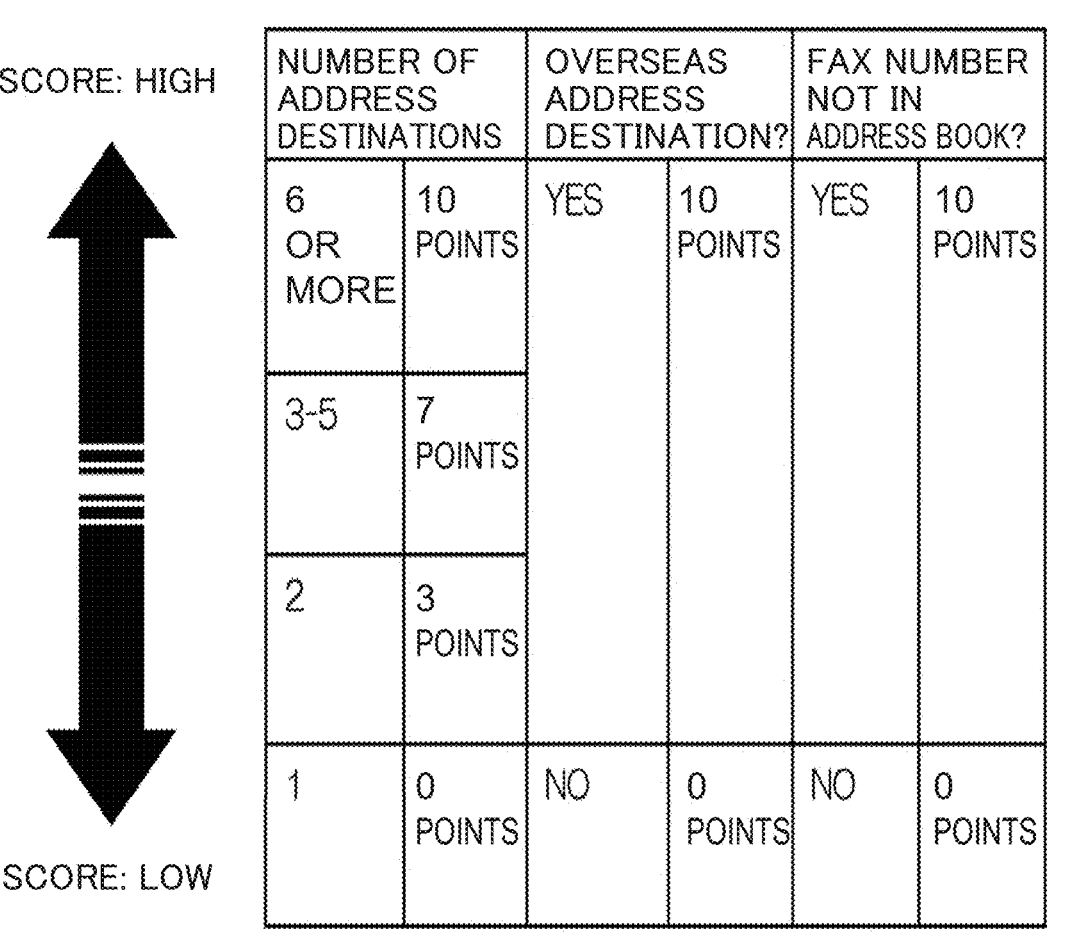

INFORMATION DISPLAY DEVICE AND COMPUTER PROGRAM TO PRIORITIZE AND TRANSMIT INFORMATION FOR VERIFICATION TO A USER

TECHNICAL FIELD

The present invention relates to an information display device and a computer program.

BACKGROUND ART

Patent Document 1 discloses a user interface control device that controls an operation screen displayed at a user interface based on a setting of the operation screen, and that also receives input to change the setting of the operation screen and displays, at the user interface, information related to mis-operation of the operation screen when a setting change has been performed based on the input.

TECHNICAL LITERATURE

Patent Literature

Patent Document 1: Japanese Patent Application Laid-Open (JP-A) No. 2009-237820

SUMMARY OF INVENTION

Technical Problem

In order to effectively utilize an operation screen displayed at a user interface, in cases in which information related to setting of processing to be executed by an operation target device is displayed at a region for receiving execution of processing, sometimes the intention of information is not correctly transmitted to a user depending on the content of the information displayed.

An object of the present invention is to provide an information display device and a computer program that are able to prioritize and transmit information for verification to a user when information related to setting of processing to be executed on an operation target device is displayed at an operation screen displayed at a user interface.

Solution to Problem

An information display device according to a first aspect of the present invention includes a processor. The processor executes processing of determining priority information to prioritize for display from among content not being displayed at an operation screen that is displayed at a user interface and that includes a region to receive execution of processing from a user, and displaying the determined priority information at the region on the operation screen.

An information display device according to a second aspect of the present invention is the information display device according to the first aspect, wherein the processor dynamically determines the priority information in accordance with a change in content being displayed at the operation screen.

An information display device according to a third aspect of the present invention is the information display device according to the second aspect, wherein the processor dynamically determines the priority information in accordance with a screen transition operation on the user interface.

An information display device according to a fourth aspect of the present invention is the information display device according to the third aspect, wherein the processor dynamically determines the priority information in accordance with a scroll operation on the user interface.

An information display device according to a fifth aspect of the present invention is the information display device according to the third aspect, wherein the processor dynamically determines the priority information in accordance with screen switching based on a selection operation on the user interface.

An information display device according to a sixth aspect of the present invention is the information display device according to any one of the first aspect to the fifth aspect, wherein the processor determines the priority information based on a value specified for setting processing that the user wishes to execute.

An information display device according to a seventh aspect of the present invention is the information display device according to the sixth aspect, wherein the processor dynamically determines the priority information based on a value specified for setting processing that the user wishes to execute.

An information display device according to an eighth aspect of the present invention is the information display device according to the sixth aspect, wherein the processor uses the value specified for the setting not displayed at the operation screen to determine the priority information.

An information display device according to a ninth aspect of the present invention is the information display device according to any one of the sixth aspect to the eighth aspect, wherein the value is set based on how the content influences cost taken for the processing, influences time taken for the processing, and influences safety of the processing.

An information display device according to a tenth aspect of the present invention is the information display device according to any one of the first aspect to the ninth aspect, wherein the processor dynamically determines the priority information based on a rank specified for setting processing that the user wishes to execute.

A computer program according to an eleventh aspect of the present invention causes a computer to execute processing. The processing includes determining priority information to prioritize for display from among content not being displayed at an operation screen that is displayed at a user interface and that includes a region to receive execution of processing from a user, and displaying the determined priority information at the region on the operation screen.

Advantageous Effects of Invention

The first aspect of the present invention is able to prioritize and make a user aware of content for verification from among content not being displayed at the operation screen.

The second aspect of the present invention is able to prioritize and make a user aware of content for verification in accordance with change of content being displayed on an operation screen.

The third aspect of the present invention is able to prioritize and make a user aware of content for verification in accordance with the screen transition operation.

The fourth aspect of the present invention is able to prioritize and make a user aware of content for verification in accordance with the scroll operation.

The fifth aspect of the present invention is able to prioritize and make a user aware of content for verification in accordance with screen switching.

The sixth aspect of the present invention is able to prioritize and make a user aware of content for verification based on a value specified for a setting.

The seventh aspect of the present invention is able to dynamically prioritize and make a user aware of content for verification.

The eighth aspect of the present invention is able to prioritize and make a user aware of content for verification based on a value specified for a setting not being displayed at the operation screen.

The ninth aspect of the present invention is able to prioritize and make a user aware, as the content for verification, of priority information determined using a value established based on how set content influences cost taken for the processing, influences time taken for the processing, and influences safety of the processing.

The tenth aspect of the present invention is able to prioritize and make a user aware of content for verification based on a rank specified for setting.

The eleventh aspect of the present invention is able to prioritize and make a user aware of content for verification from among content not being displayed at the operation screen.

BRIEF DESCRIPTION OF DRAWINGS

FIG. 7 is a diagram illustrating an example of a user interface displayed on a display section.

FIG. 8 is a diagram illustrating an example of a table referenced when determining priority information.

FIG. 9 is a diagram illustrating an example of a table referenced when determining priority information.

DESCRIPTION OF EMBODIMENTS

Figure 1:
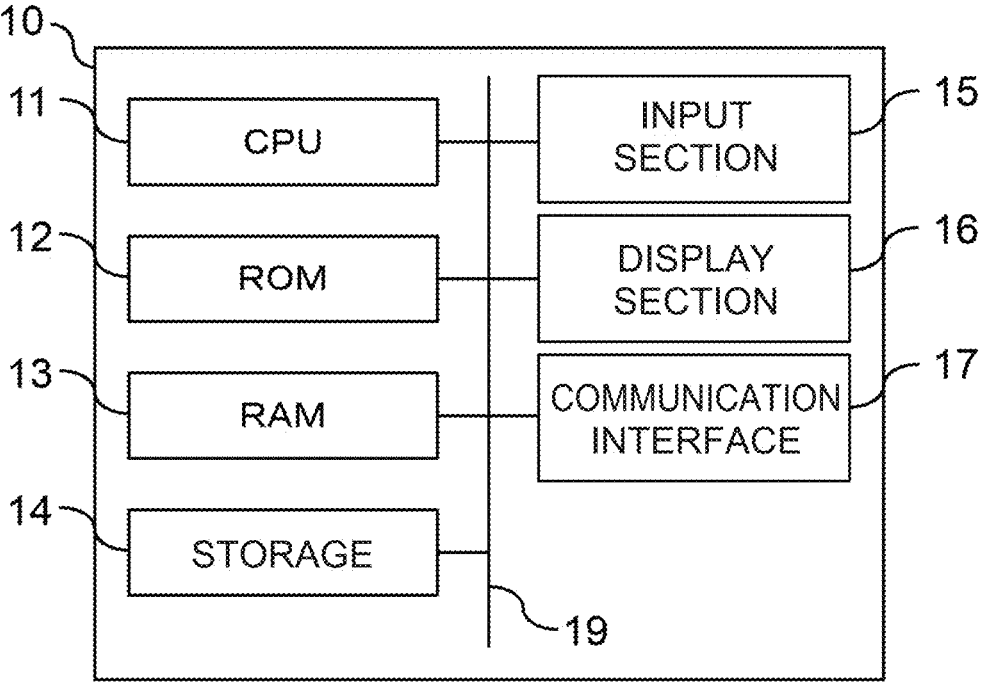
FIG. 1 is a block diagram illustrating a hardware configuration of an information display device according to an exemplary embodiment of technology disclosed herein.

Description follows regarding an example of an exemplary embodiment of the present invention, with reference to the drawings. Note that the same reference numerals are appended in the drawings to configuration elements and parts that are the same or equivalent. Moreover, dimensional proportions in the drawings are exaggerated for ease of explanation and sometimes differ from actual proportions.

FIG. 1 is a block diagram illustrating a hardware configuration of an information display device 10 according to the present exemplary embodiment. The information display device 10 is provided with a printing function and a facsimile function, and may be an image forming device for displaying a graphical user interface (GUI), an information processing device such as a smartphone, or the like.

As illustrated in FIG. 1, the information display device 10 includes a central processing unit (CPU) 11, read only memory (ROM) 12, random access memory (RAM) 13, storage 14, an input section 15, a display section 16, and a communication interface (I/F) 17. Each configuration is connected so as to be capable of communicating with each other through a bus 19.

The CPU 11 is a central processing unit for executing various programs, and controlling each section. Namely, the CPU 11 reads a program from the ROM 12 or the storage 14, and executes the program using the RAM 13 as workspace. The CPU 11 controls each of the above configuration and performs various computation processing according to the program stored on the ROM 12 or the storage 14. In the present exemplary embodiment, an information display program for displaying a graphical user interface is stored on the ROM 12 or the storage 14.

The ROM 12 stores various programs and various data. The RAM 13 serves as a workspace to temporarily store a program or data. The storage 14 is configured by a storage device such as a hard disk drive (HDD), solid state drive (SSD), flash memory, or the like, and stores various programs including an operating system, and various data.

The input section 15 includes a pointing device such as a mouse, and a keyboard, and is employed to perform various inputs.

The display section 16 is, for example, a liquid crystal display, and displays various information. In the present exemplary embodiment, a touch panel style is adopted for the display section 16, which also functions as the input section 15.

The communication interface 17 is an interface for communicating with other devices and employs, for example, a standard such as Ethernet (registered trademark), FDDI, or Wi-Fi (registered trademark).

When the above information display program is executed, the information display device 10 employs the hardware resources described above to implement various functions. Description follows regarding a functional configuration implemented by the information display device 10.

Figure 2:
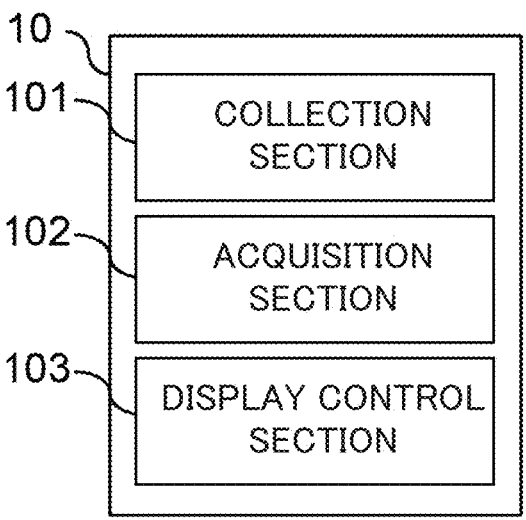
FIG. 2 is a block diagram illustrating an example of a functional configuration of an information display device.

FIG. 2 is a block diagram illustrating an example of a functional configuration of the information display device 10.

As illustrated in FIG. 2, the information display device 10 includes, as functional configuration, a collection section 101, an acquisition section 102, and a display control section 103. Each of the functional configuration is implemented by the CPU 11 reading and executing the information display program stored on the ROM 12 or the storage 14.

The collection section 101 collects information of the information display device 10. The information to be collected may differ depending on the device type of the information display device 10. For example, in cases in which the information display device 10 is an image forming device, the collection section 101 acquires, for example, an information display state, a state of print settings, transmission settings, disposable components, and log information such as a transmission record, a setting record, or the like of the display section 16, and environment information such as temperature, time, or the like. The environment information may be acquired by a sensor provided to the information display device 10. The print settings may, for example, be a number of print copies, size of paper, printing side (double-sided or single-sided), number of pages per single sheet, color settings (color or black and white), or the like. The transmission settings may be a facsimile transmission destination, a paper size, a transmission quality, or the like. The collection section 101 also acquires a state of user interface being displayed on the display section 16.

The acquisition section 102 acquires priority information to prioritize for display based on the information collected by the collection section 101. The priority information is, for example, an event currently occurring in the information display device 10, and is information not represented on the user interface being displayed on the display section 16.

More specifically, the acquisition section 102 references the information collected by the collection section 101 against the information stored in the storage 14 or the like. The acquisition section 102 then acquires priority information to prioritize for display by comparing this information.

The acquisition section 102 may dynamically acquire the priority information in accordance with change in content being displayed at the display section 16 so as to determine the priority information. For example, the acquisition section 102 may dynamically acquire the priority information in accordance with a screen transition operation on the user interface being displayed at the display section 16 so as to determine the priority information. Moreover, for example, the acquisition section 102 may dynamically acquire the priority information in accordance with a scroll operation on the user interface so as to determine the priority information. Moreover, for example, the acquisition section 102 may dynamically acquire the priority information in accordance with screen switching based on a selection operation on the user interface so as to determine the priority information.

The acquisition section 102 may acquire priority information based on a value specified through the user interface for setting processing a user wants to execute so as to determine the priority information. In such cases, the acquisition section 102 may dynamically acquire the priority information based on the value specified for setting the processing so as to determine the priority information.

The acquisition section 102 may acquire the priority information using a value specified for a setting not displayed at an operation screen so as to determine the priority information. This value may be established based on how content influences cost taken for the processing to be executed by the information display device 10, influences time taken for the processing, and influences safety of the processing. Examples of influence to the cost taken for the processing include settings such as a number of pages to be printed on a single sheet, and a setting of color printing or not. Examples of influence to the time taken for the processing include a setting of a number of print copies and a setting of a number of transmissions. Examples of influence to the safety of the processing include whether or not a facsimile destination address is recorded in an address book and whether or not the facsimile destination address is present in past transmission history.

The display control section 103 controls display of the user interface at the display section 16. More specifically, the display control section 103 displays the acquired priority information at a specific region at the operation screen displayed at the user interface. A specific example of the priority information displayed on the display section 16 is described later.

The information display device 10 according to the present exemplary embodiment includes the above configuration and so is able to display the most prioritized information from among the content not being displayed at the user interface displayed on the display section 16. The information display device 10 according to the present exemplary embodiment is able prioritize and clearly convey to the user information for verification by prioritizing and displaying information for verification from among content not being displayed at the user interface displayed on the display section 16.

Next explanation follows regarding operation of the information display device 10.

Figure 3:
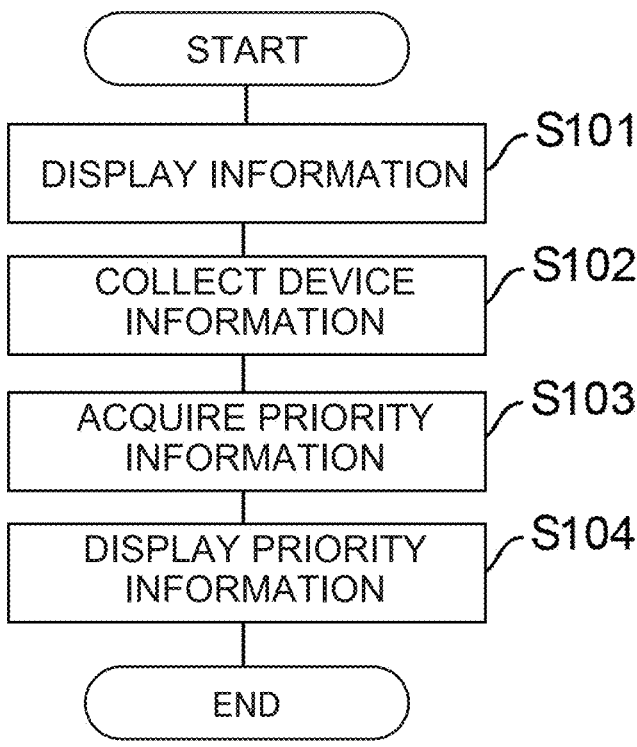
FIG. 3 is a flowchart illustrating a flow of information display processing by an information display device.

FIG. 3 is a flowchart illustrating a flow of the information display processing by the information display device 10. The information display processing is performed by the CPU 11 reading the information display program from the ROM 12 or the storage 14, and expanding and executing the information display program in the RAM 13.

The CPU 11 collects the information of the information display device 10 (step S102) in a state in which information is being displayed on the display section 16 (step S101). In cases in which the information display device 10 is an image forming device, the CPU 11, for example as described above, acquires the information display state, the state of print settings, transmission settings, disposable components, and the log information such as a transmission record, a setting record, or the like of the display section 16, and environment information such as temperature, time, or the like.

Continuing from step S102, the CPU 11 acquires the priority information for prioritizing display (step S103) based on the information collected at step S102. The priority information includes, for example, information related to an event occurring due to processing being executed based on an operation instruction from a user to the information display device 10. The priority information includes, for example, information related to an event currently occurring in the information display device 10.

Continuing from step S103, the CPU 11 displays the acquired priority information at a specific region of the operation screen being displayed at the user interface for display on the display section 16 (step S104).

Figure 4:
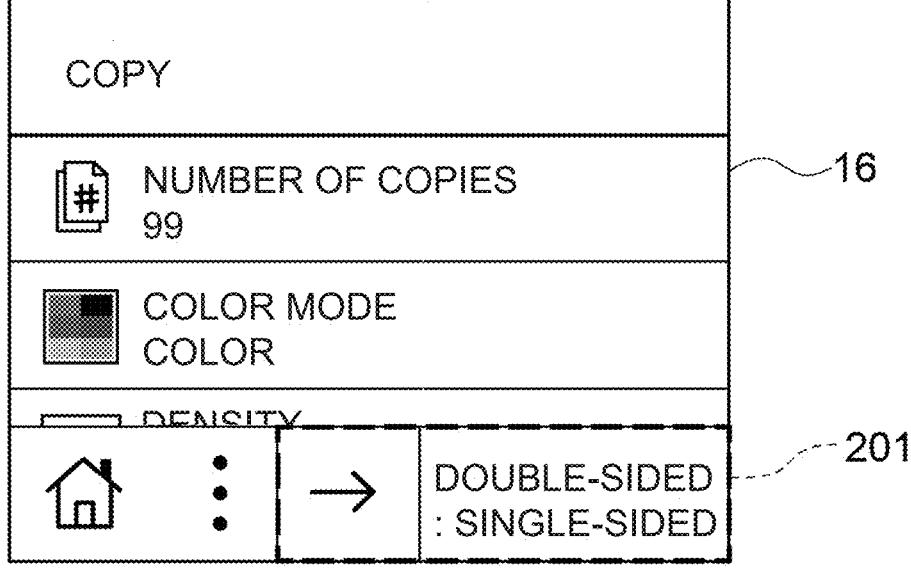
FIG. 4 is a diagram illustrating an example of a user interface displayed on a display section.

Description follows regarding an example of display of the user interface on the display section 16 by the CPU 11. FIG. 4 is a diagram illustrating an example of a user interface displayed on the display section 16 by the CPU 11. FIG. 4 illustrates an example of the user interface displayed on the display section 16 in a state in which a user has not performed an operation on the display section 16 (a default state). In the present exemplary embodiment, the user interface is displayed on the display section 16 so as to enable a specific processing, such as print processing, facsimile transmission processing, or the like, to be executed by a user touching an instruction region 201 with a finger and sliding the finger toward the right. In the default state, the CPU 11 displays at the instruction region 201 a setting determined as the priority information from out of settings not being displayed at the user interface. FIG. 4 illustrates an example of a case in which the CPU 11 has determined printing side setting as the priority information, and the printing side setting is being displayed at the instruction region 201.

Figure 5:
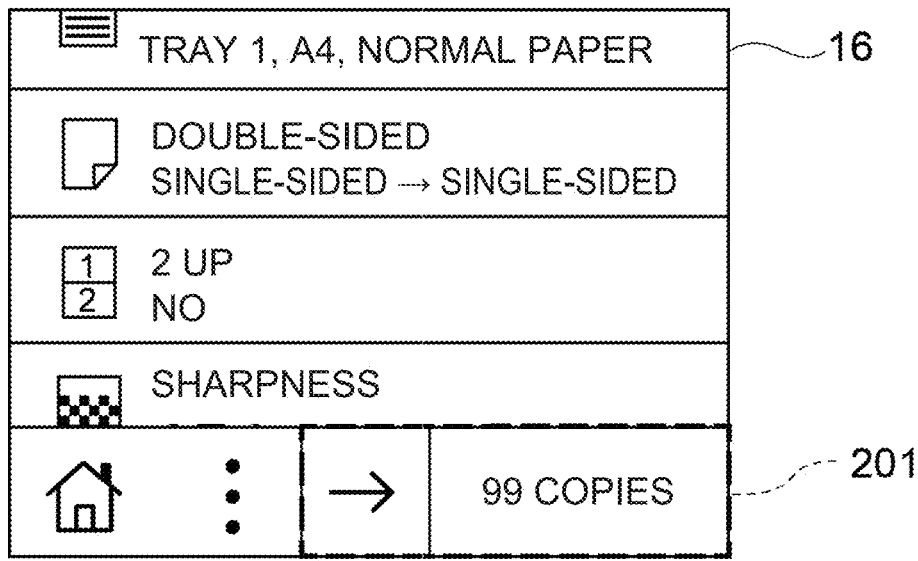
FIG. 5 is a diagram illustrating an example of a user interface displayed on a display section.

FIG. 5 is a diagram illustrating an example of the user interface displayed by the CPU 11 on the display section 16. FIG. 5 illustrates an example of the user interface displayed on the display section 16 for a case in which a setting for a number of print copies that was displayed in FIG. 4 is no longer being displayed due to a scroll operation by the user at the user interface. When the number of print copies setting that was displayed in FIG. 4 is no longer being displayed and the CPU 11 has determined the number of print copies setting as the priority information, instead of the printing side setting the CPU 11 displays the number of print copies setting as the priority information at the instruction region 201. Even in cases in which the printing side setting is being displayed on the display section 16 however the setting for the number of print copies is no longer being displayed as in the example of FIG. 5, without the printing side setting being continuously displayed the CPU 11 still displays the printing side setting at the instruction region 201 similarly to in FIG. 4 when determined that the printing side setting is the priority information.

Figure 6:
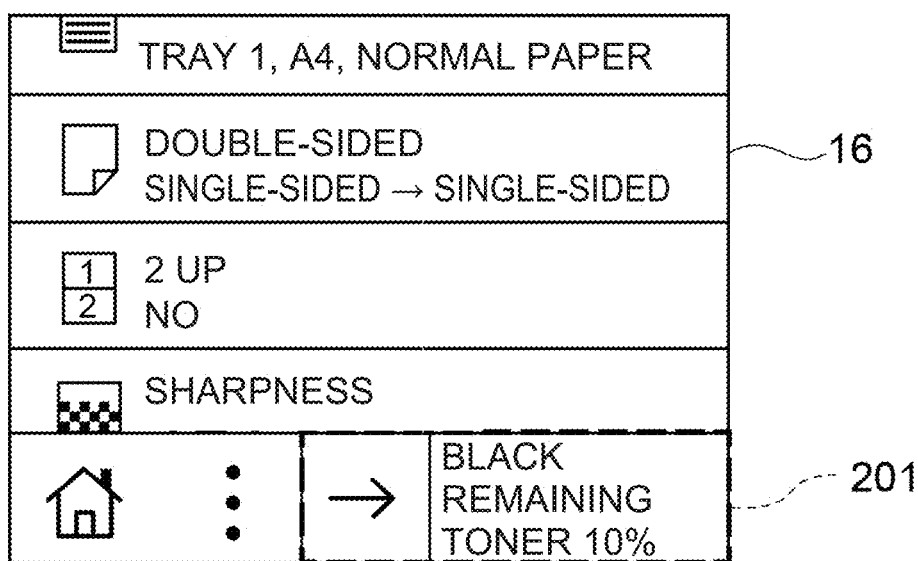
FIG. 6 is a diagram illustrating an example of a user interface displayed on a display section.

FIG. 6 is a diagram illustrating an example of a user interface displayed by the CPU 11 on the display section 16. FIG. 6 illustrates an example of a user interface displayed on the display section 16 for a case in which the number of print copies setting that was displayed in FIG. 4 is no longer being displayed due to a scroll operation at the user interface by the user. When the number of print copies setting displayed in FIG. 4 is no longer being displayed and the CPU 11 determines remaining toner information as the priority information, the CPU 11 displays the remaining toner information as the priority information at the instruction region 201 instead of the printing side setting. In cases in which the printing side setting is being displayed on the display section 16 and the number of print copies setting is no longer being displayed as in the example in FIG. 6, without the printing side setting being continuously displayed the CPU 11 is still able to determine the printing side setting as the priority information and to display the printing side setting at the instruction region 201 similarly to in FIG. 4.

FIG. 7 illustrates diagrams of examples of user interfaces displayed by the CPU 11 on the display section 16. FIG. 7 illustrates examples in which the content of information displayed at the instruction region 201 is changed by a scroll operation at the user interface by a user. FIG. 7 (A) illustrates, similarly to in FIG. 4, an example in which the CPU 11 determines the printing side setting as the priority information and the printing side setting is being displayed at the instruction region 201.

A scroll operation is performed in an upward direction with respect to the user interface being displayed on the display section 16 by the hand U of a user from the state illustrated in FIG. 7 (A), and when, as illustrated in FIGS. 7 (B) and (C), the number of print copies setting being displayed at FIG. 7 (A) is no longer being displayed, then as in FIG. 7 (D) the CPU 11 displays a setting of whether or not to print two pages of print on a single sheet (whether or not to perform 2 up printing) as the priority information at the instruction region 201 instead of the printing side setting. When changing the information displayed in the instruction region 201, the CPU 11 may also scroll display at the instruction region 201 in accordance with the scroll operation such as illustrated in FIG. 7 (C), (D).

Next an example of a table referenced by the CPU 11 when determining the priority information will be described. FIG. 8 is a diagram illustrating an example of a table referenced by the CPU 11 when determining the priority information. FIG. 8 illustrates an example of a table established for copy function settings. The example of FIG. 8 illustrates a table in which scores have been respectively set considering the importance level of functions in a sequence of the number of copies setting, a double-sided copy setting, a color/monochrome setting, a paper quality setting, and a remaining toner amount.

The CPU 11 calculates a number of points for setting items not being displayed according to the table of FIG. 8, with setting items being displayed on the display section 16 given 0 points. When there is the same number of points, the CPU 11 prioritizes the function with the higher importance level. Note that when there is the same number of points the CPU 11 may display all of these. In such cases, the CPU 11 may switch display in importance level sequence at a fixed interval of time.

For example, consider a case in which the settings being displayed on the display section 16 are the number of copies setting, the double-sided print setting, and the two up printing setting, and the CPU 11 has acquired, as a result for items not being displayed on the display section 16 and for a state of the information display device 10, a remaining toner amount exceeds 10%, the paper quality of printing paper is normal paper, and the color/monochrome setting is color printing. In such cases the CPU 11 takes the number of points as 10 points when the color/monochrome setting is color printing, and since this is higher than the number of points determined for the other settings, the CPU 11 displays information of the color/monochrome setting at the instruction region 201.

FIG. 9 is a diagram illustrating an example of a table referenced by the CPU 11 when determining the priority information. FIG. 9 illustrates an example of a table that has been established for facsimile function settings. The example of FIG. 9 illustrates a table in which scores have been respectively set considering the importance level of functions in a sequence of a number of address destinations, whether or not there is an overseas address destination, and whether or not there is a number not in the address book.

The CPU 11 calculates a number of points according to the table of FIG. 9 for setting items not being displayed, with setting items being displayed on the display section 16 given a score of 0 points. When there is the same number of points, the CPU 11 prioritizes the function with the higher importance level. Note that when there is the same number of points the CPU 11 may display all of these. In such cases, the CPU 11 may switch display in importance level sequence at a fixed interval of time.

For example, in cases in which the number of address destinations is being displayed on the display section 16, consider an example in which the CPU 11 has acquired, as a result for items not being displayed on the display section 16, a FAX number not in the address book and an overseas address destination being included as a transmission destination. In such cases, the CPU 11 gives 10 points both for the number of points when a FAX number not in the address book has been included in the transmission destinations and also for the number of points when an overseas address destination has been included. This means that the CPU 11 displays at the instruction region 201 the function of high importance level, i.e. information that there is a FAX number not in the address book included in the transmission destination. Moreover in such cases, the CPU 11 may display at the instruction region 201 information that there is a FAX number not in the address book included in the transmission destination, and information that there is an overseas address destination included, by switching at a fixed interval of time.

Although examples of tables determined with scores in advance for setting functions have been illustrated in FIG. 8 and FIG. 9, the present invention is not limited to such examples. The CPU 11 may pre-determine a priority rank of information for display at the instruction region 201. For example, the CPU 11 may display at the instruction region 201 a setting item having the highest priority rank from out of the setting items not being displayed on the screen.

Note that although in each of the above embodiments the information display processing is executed by software (a program) being read by the CPU, the processing may be executed by various processors other than a CPU. Such processors include programmable logic devices (PLD) that allow circuit configuration to be modified post-manufacture, such as a field-programmable gate array (FPGA), and dedicated electric circuits, these being processors including a circuit configuration custom-designed to execute specific processing, such as an application specific integrated circuit (ASIC). Moreover, the information display processing may be executed by any one of these various types of processors, or may be executed by a combination of two or more of the same type or different types of processors (such as plural FPGAs, or a combination of a CPU and an FPGA). The hardware structure of these various types of processors is more specifically an electric circuit combining circuit elements such as semiconductor elements.

Moreover, although in each of the above embodiments cases have been described in which the program of the information display processing is pre-stored (installed) in the ROM or storage, there is no limitation thereto. The program may be provided in a format stored on a non-transitory recording medium such as a compact disk read only memory (CD-ROM), digital versatile disk read only memory (DVD-ROM), universal serial bus (USB) memory, or the like. Moreover, the program may be in a format downloadable from an external device over a network.

In each of the above exemplary embodiments processor indicates widely defined processors, and includes general processors (for example a central processing unit (CPU) or the like), specialized processors (for example a graphics processing unit (GPU), an application specific integrated circuit (ASIC), an field programmable gate array (FPGA), a programmable logic device, and the like).

Moreover, operation of the processor in each of the above exemplary embodiments is not limited to being performed on a single processor, and may be performed by plural processors present at physically separated locations acting in coordination with each other. Moreover, the sequence of each operation of the processors is not limited to only the sequences described in the above exemplary embodiments, and may be modified as appropriate.

EXPLANATION OF REFERENCE NUMERALS 10 information display device
201 instruction region

The invention claimed is:

1. An information display device comprising:

a display configured to display, at a user interface, an operation screen including an instruction region configured to receive execution of processing from a user by a slide operation;

a memory storing a table in which points are set for a plurality of setting items; and a processor coupled to the memory, wherein the processor executes processing of:

while the operation screen is displayed, acquiring operation-screen information indicating setting items displayed on the operation screen, and acquiring information of the information display device including settings related to the processing;

identifying setting items not displayed on the operation screen based on the acquired operation-screen information;

for each of the identified setting items, calculating a point value in accordance with the table based on the settings related to the processing included in the acquired information of the information display device;

determining priority information to prioritize for display from among setting items not displayed on the operation screen based on the calculated points; and displaying the determined priority information in the instruction region on the operation screen.

2. The information display device of claim 1, wherein the processor dynamically determines the priority information in accordance with a change in content being displayed at the operation screen.

3. The information display device of claim 2, wherein the processor dynamically determines the priority information in accordance with a screen transition operation on the user interface.

4. The information display device of claim 3, wherein the processor dynamically determines the priority information in accordance with a scroll operation on the user interface.

5. The information display device of claim 3, wherein the processor dynamically determines the priority information in accordance with screen switching based on a selection operation on the user interface.

6. The information display device of claim 1, wherein the processor determines the priority information based on a value specified for setting processing that the user wishes to execute.

7. The information display device of claim 6, wherein the processor dynamically determines the priority information based on a value specified for setting processing that the user wishes to execute.

8. The information display device of claim 6, wherein the processor uses the value specified for the setting processing, which is not displayed at the operation screen, to determine the priority information.

9. The information display device of claim 6, wherein the value is established based on how the content influences cost taken for the processing, influences time taken for the processing, and influences safety of the processing.

10. The information display device of claim 1, wherein the processor dynamically determines the priority information based on a rank specified for setting processing that the user wishes to execute.

11. A non-transitory computer-readable storage medium storing a computer program executable by a computer to perform processing, the processing comprising:

displaying, at a user interface, an operation screen including an instruction region configured to receive execution of processing from a user by a slide operation;

while displaying the operation screen, acquiring operation-screen information indicating setting items displayed on the operation screen, and acquiring information of the information display device including settings related to the processing;

identifying setting items not displayed on the operation screen based on the acquired operation-screen information;

for each of the identified setting items, calculating a point value in accordance with a table, in which points are set for a plurality of setting items, based on the settings related to the processing included in the acquired information of the information display device;

determining priority information to prioritize for display from among setting items not displayed on the operation screen based on the calculated points; and displaying the determined priority information in the instruction region on the operation screen.

* * * * *